W. E. TAYLOR.
MEASURING AND FEEDING MECHANISM.
APPLICATION FILED MAR. 9, 1912.
1,122,334. Patented Dec. 29, 1914.
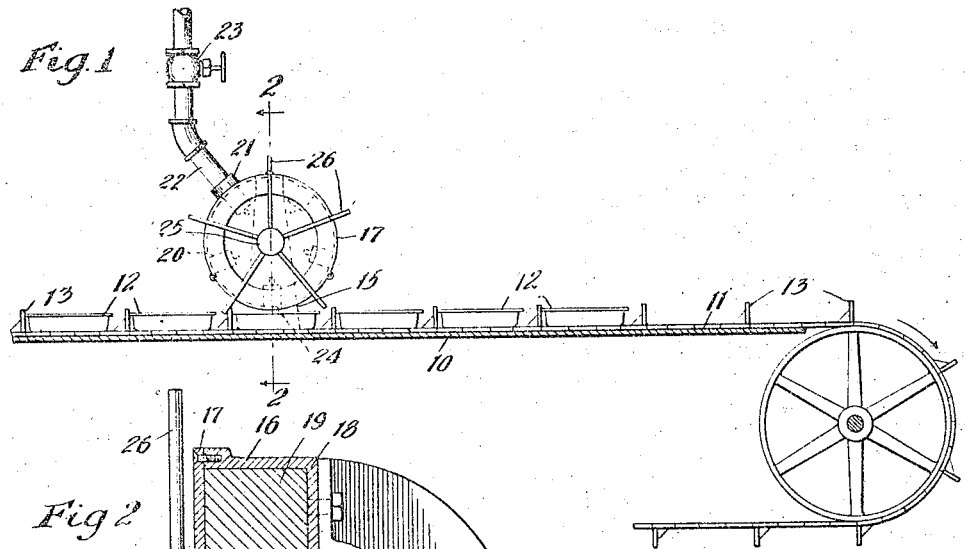
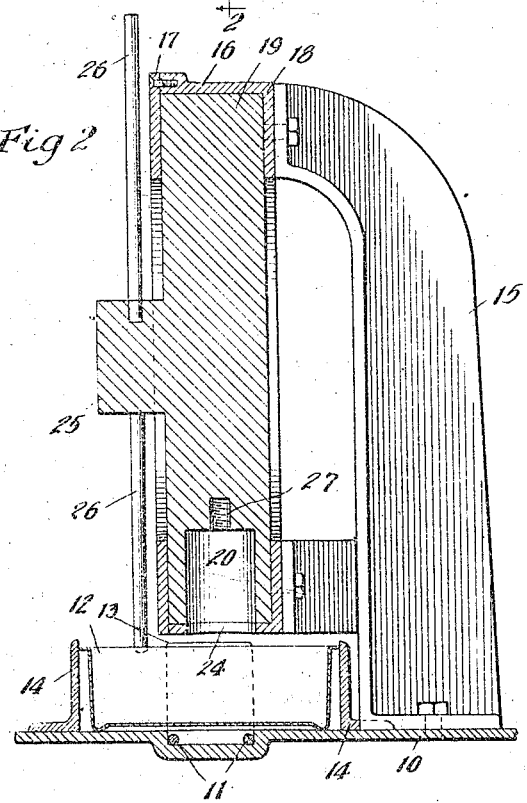
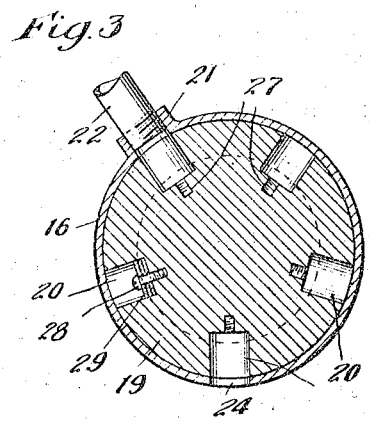
Witnesses:
Inventor:
William E. Taylor
By Munday, Evarts, Adcock & Clark
Attys

UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

MEASURING AND FEEDING MECHANISM.

1,122,334.        Specification of Letters Patent.       Patented Dec. 29, 1914.

Application filed March 9, 1912. Serial No. 682,690.

*To all whom it may concern:*

Be it known that I, WILLIAM E. TAYLOR, a citizen of the United States, residing in Eastport, in the county of Washington and State of Maine, have invented a new and useful Improvement in Measuring and Feeding Mechanism, of which the following is a specification.

This invention relates to improvements in measuring and feeding devices.

The object of the invention is to provide a structure which shall be particularly adapted to the measuring and feeding of definite quantities of liquid, such, for instance, as oil to be fed to filled sardine cans.

Another object of the invention is to provide a measuring and feeding device which shall be operable only when a can to be filled is presented to the measuring and feeding device.

Still another object of the invention is to provide a structure which may be readily adjustable to measure and feed different quantities of material to the receptacle to be supplied thereby.

My invention further consists in the novel construction of parts and devices and in the novel combinations of parts and devices herein shown and described and more particularly specified in the claim.

In many arts where a substance is to be measured and fed to a can or receptacle, it is essential that the device be so constructed that when a can or receptacle is not presented to the measuring and feeding device, no material or substance will be fed or supplied by the device. This is especially true in the case where olive oil is to be supplied to filled sardine cans, inasmuch as canners are restricted in practice to a certain amount of oil for a given number of cans to be supplied, so that it becomes essential that none of the oil be spilled or wasted. Furthermore, it is essential that the same amount of oil be supplied to each can, and it is desirable that a measuring and feeding device be so constructed that it may be readily adapted to measure and feed different quantities to different sized cans.

One structure embodying my improvements comprises a measuring disk rotatable about a substantially horizontal axis, and having a plurality of measuring pockets or recesses in the periphery thereof radially arranged, each of said pockets being adapted to register first with a supply pipe and then with an outlet hole in a casing within which the disk rotates, said outlet hole being disposed over and in line with a conveyer adapted to feed can bodies beneath the measuring and feeding device, said disk being operated by the can body so that if no can body is presented, the disk remains stationary and no oil is wasted or spilled.

In the drawing forming a part of this specification, Figure 1 is an elevation, showing a machine embodying my improvements. Fig. 2 is a vertical, sectional view, taken on the line 2—2 of Fig. 1, upon an enlarged scale, and Fig. 3 is a sectional view of the feeding and measuring disk, taken at right angles to the sectional view shown in Fig. 2, and upon a somewhat smaller scale.

In the drawings, 10 denotes a table or support over which is adapted to run an endless conveyer 11, adapted to feed a plurality of can bodies 12, the conveyer 11 being provided with a plurality of spaced fingers or flights 13 adapted to engage each can body and propel the same along the table. The table is preferably provided with upstanding guides 14 between which the can bodies are conveyed. Secured to the table 10 is a bracket 15, having secured thereto a vertically arranged, annular casing 16, the latter comprising a removable plate 17 secured to a second plate 18, the latter being secured in any suitable manner to the bracket 15. Rotatable within the casing 16 is a circular disk 19, the latter being provided with a plurality of measuring pockets or recesses 20 located in the periphery of the disk 19 and arranged radially thereof. The casing 16 is provided with an interiorly threaded bushing 21 in which is threaded the end 22 of a feed pipe connected to any suitable tank for containing the liquid or oil to be measured and fed by the device, the pipe 22 being preferably provided with a valve 23. At the lower portion of the casing 16, there is provided an outlet hole 24 with which each of the pockets 20 is adapted to register in turn, the outlet hole 24 being located in line with and above the can bodies as they are conveyed beneath the measuring and feeding device by the conveyer 11. The disk 19 is furthermore provided with a hub 25 in which are secured a plurality of radially arranged arms 26, the number of the arms 26 corresponding to the number of measuring pockets 20, each of said arms 26 being adapted to be engaged by a can body 12, to intermittently rotate the measuring disk 19, so that it will be evident that unless a can body is conveyed beneath the disk, the disk will not be rotated.

In order to provide means for varying the amount of liquid to be measured and fed, each of the pockets 20 is provided with a tapped hole 27 at the inner end thereof, in which is adapted to be threaded a screw 28, the latter being adapted to retain one or more washers or disks 29, whereby the capacity of each of the pockets 20 may be varied as desired.

Many changes and variations may be made in the structure and details of the device which I have described, without departing from the spirit of the invention, and all such changes and modifications are contemplated as fall within the scope of the appended claim.

I claim:—

A measuring and feeding mechanism of the character described comprising, in combination: an annular casing arranged in a vertical plane and having an inlet near the top thereof and an outlet at the bottom; a measuring disk rotatably mounted within said casing, said disk having a plurality of radially arranged measuring pockets in the periphery thereof, said pockets being adapted to register successively with the inlet and outlet of the casing; a table over which said casing is located; means for conveying cans and the like beneath said casing and over the table; and means, automatically operated by the cans for imparting movement to said measuring disk, said means including a star wheel, substantially as specified.

WILLIAM E. TAYLOR.

Witnesses:
W. D. Foster,
C. W. Graham.